Dec. 3, 1929.  O. L. McKINLEY  1,737,934
GLARE SHIELD
Filed Feb. 28, 1927
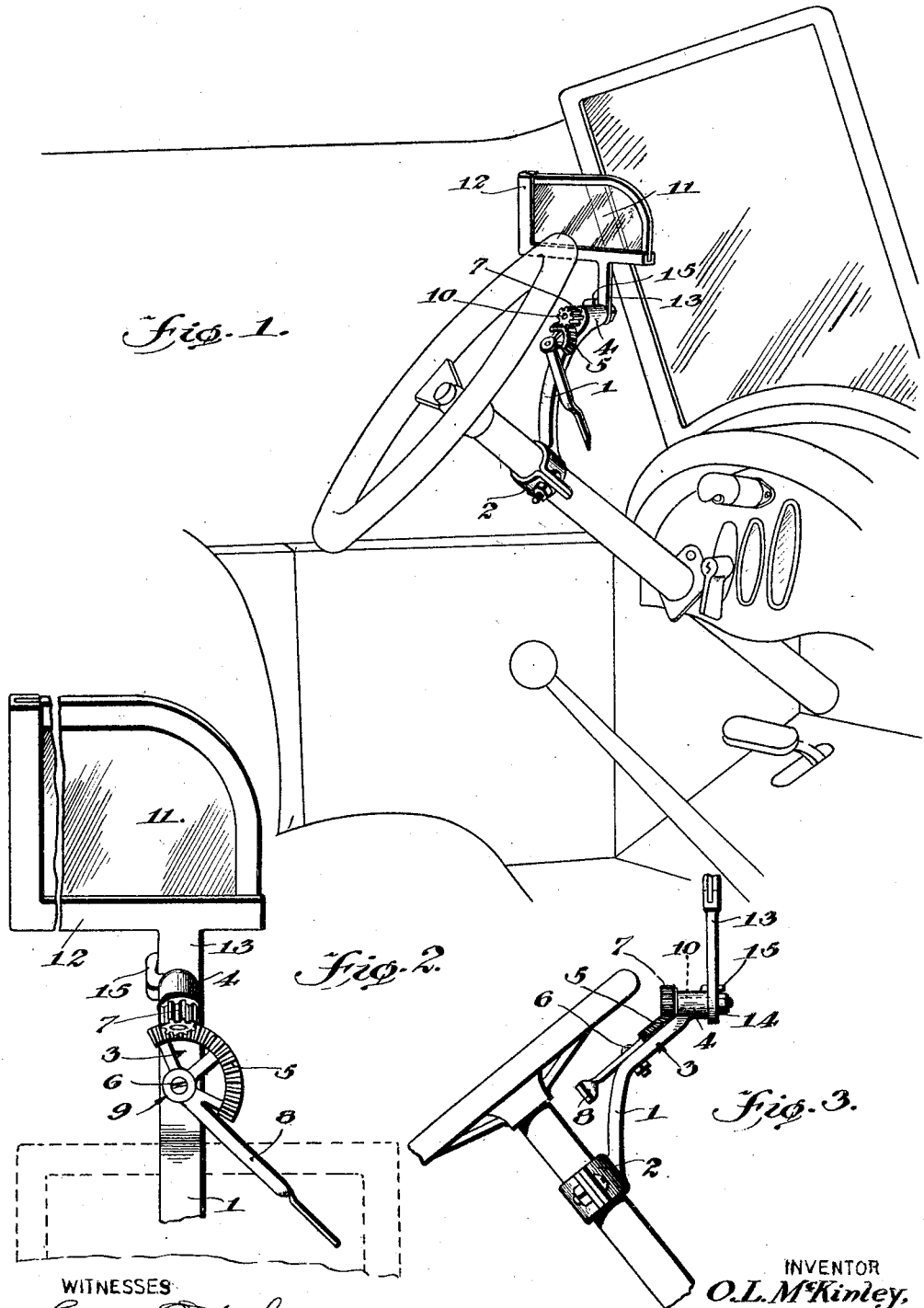
INVENTOR
O. L. McKinley,
BY
ATTORNEYS
WITNESSES Patented Dec. 3, 1929

1,737,934

UNITED STATES PATENT OFFICE

OSCAR L. McKINLEY, OF DEMOPOLIS, ALABAMA

GLARE SHIELD

Application filed February 28, 1927. Serial No. 171,628.

This invention relates to improvements in glare shields, an object being to provide a shield that is readily attachable to a part of the chassis of a motor vehicle, preferably the steering column in such manner, and in such position as to readily be accessible by the operator so that it can be moved into operative and inoperative positions with as much ease as the throttle lever can be moved.

Other objects and advantages appear in the following specification, reference being had to the accompanying drawing, in which Figure 1 is a perspective view of a portion of a motor vehicle showing the improved glare shield applied to the steering column, Figure 2 is a plan view, Figure 3 is a side elevation.

In carrying out the invention provision is made of a bracket 1 which has a suitable clamping device 2 at one end and is bent into predetermined shape at the other. This shape, from inspection of Figure 3, is seen to comprise the inclined portion 3 and the bearing hub 4.

A gear 5, journaled upon the inclined portion 3 as indicated by the means 6, actuates the pinion 7 when the handle 8 carried by the gear 5 as at 9 (Fig. 2) is moved up or down.

A semaphore shaft 10 constituting a rock shaft and carrying the pinion 7, turns when the handle 8 is moved as stated. This shaft is journaled in the bearing hub 4. A semaphore 11 is carried by the forwardly extended end of the shaft 10. The semaphore is composed of such substance as will shield the eyes of the driver from the glare of oncoming headlights. For this purpose it may consist of colored glass, celluloid, mica or the like, and it may either be transparent as the foregoing substances usually are, or translucent.

The edges of the semaphore 11 are metalbound as at 12. The metallic binding may be carried completely around, as shown, there being an arm or extension 13 therefrom having a hole to receive the end of the shaft 10, this extension constituting a rock arm attached to the rock shaft 10. This end of the shaft is reduced and threaded to receive clamping means 14. A stop 15, extending from the hub 4, limits the upward movement of the semaphore by virtue of the engagement therewith of the arm 13.

The operation may be readily understood. The dangers of driving a motor vehicle at night have been attributed in no small measure to the glare of oncoming headlights, and while shields of various sorts have been devised in the past for the purpose of screening the rays of light and thereby protecting the eyes of the driver yet these have the disadvantage of being in the way at times when the driver could work to better advantage if his line of vision were absolutely unobstructed.

These circumstances have led to the development of the movable glare shield herein disclosed. This shield is normally out of the way as suggested by the dotted lines in Fig. 2. At such time, the handle 8 assumes the dotted line position also shown in Figure 2. When the glare shield is needed, it may be instantly thrown up into the operative position (full lines) by merely pulling down upon the handle until the stop 15 is engaged by the arm 13 of the glare shield frame. The handle 8 may be reached by the operator without necessarily removing his hand from the steering wheel of the motor vehicle, and to that end the handle 8 is as easy and convenient to operate as the ordinary throttle lever.

The bracket 2 makes it possible to attach the device to any steering column, and the device may be brought up as close to the steering wheel as the operator may desire. Normally the handle 8 is up, that is to say when the glare shield 11 is in the depressed or non-operative position. Upon moving the handle downwardly the action of the gear 5 and pinion 7 is such as to revolve the shaft 10 in the counter-clockwise direction and thus raise the glare shield to the elevated and operative position. An advantage of the device is that while the shield 11 screens the objectionable rays of light from the left, the right side is left unobstructed to the view of the operator.

While the construction and arrangement of the improved glare shield is that of a generally preferred form, obviously modifications and changes may be made without departing from the spirit of the invention or the scope of the claims.

I claim:

1. A glare shield comprising a bracket having a steering post clamp at one end and an extension arm extending therefrom and terminating in a bearing hub forwardly of the steering post, a rock shaft journaled in and projecting beyond the ends of said hub, a pinion affixed to one projecting end of said shaft, a rock arm affixed to the other end of said shaft and provided with a frame carrying a glare shield, a lever operable gear mounted on said bracket arm extension and meshing with said pinion, and an abutment extending from said bracket in the path of movement of said rock arm to position the glare shield in operative relation to the driver of the motor vehicle, said glare shield and rock arm being supported by said hub arm for movement in a plane forwardly of the steering post.

2. A glare shield comprising a bracket having a steering post clamp and an arm extending therefrom forwardly of the steering post and terminating in a bearing hub, a rock shaft journaled in said hub mounting an actuating gear on one end, a light shield having an edge binding frame provided with an extension constituting a rock arm and affixed to the other end of said rock shaft, and an actuating gear mounted on said bracket arm and meshing with said rock shaft gear, said actuating gear having an operating lever extending therefrom for manually effected oscillation of the rock shaft and its attached light shield, and said bearing hub arm positioning said rock arm for movement of the light shield in a plane forwardly of the steering post.

OSCAR L. McKINLEY.